United States Patent
Dar et al.

(10) Patent No.: US 12,461,652 B2
(45) Date of Patent: Nov. 4, 2025

(54) SYSTEM AND METHOD FOR MACHINE LEARNING-BASED DATA ARCHIVING IN STORAGE SYSTEMS

(71) Applicant: Dell Products L.P., Round Rock, TX (US)

(72) Inventors: Shaul Dar, Petach Tikva (IL); Ramakanth Kanagovi, Bengaluru (IN); Guhesh Swaminathan, Tamil Nadu (IN); Rajan Kumar, Nawada (IN)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/354,007

(22) Filed: Jul. 18, 2023

(65) Prior Publication Data
US 2025/0028444 A1    Jan. 23, 2025

(51) Int. Cl.
  *G06F 3/06*    (2006.01)
(52) U.S. Cl.
  CPC ............ *G06F 3/061* (2013.01); *G06F 3/0647* (2013.01); *G06F 3/067* (2013.01)

(58) Field of Classification Search
  None
  See application file for complete search history.

(56) References Cited

FOREIGN PATENT DOCUMENTS

| CN | 111798272 A | * | 10/2020 | ....... G06F 18/24133 |
|---|---|---|---|---|
| CN | 114202773 A | * | 3/2022 | |

* cited by examiner

*Primary Examiner* — Brian R Peugh
(74) *Attorney, Agent, or Firm* — Brian J. Colandreo; Heath M. Sargeant; Holland & Knight LLP

(57) ABSTRACT

A method, computer program product, and computing system for processing a plurality of historical input/output (IO) requests associated with a plurality of storage objects of a storage system from a plurality of time intervals. The plurality of storage objects may be divided into a plurality of storage activity classes using a classification-based machine learning model and the plurality of historical IO requests. A next access time for each storage object may be forecasted based upon, at least in part, the plurality of storage activity classes.

20 Claims, 6 Drawing Sheets

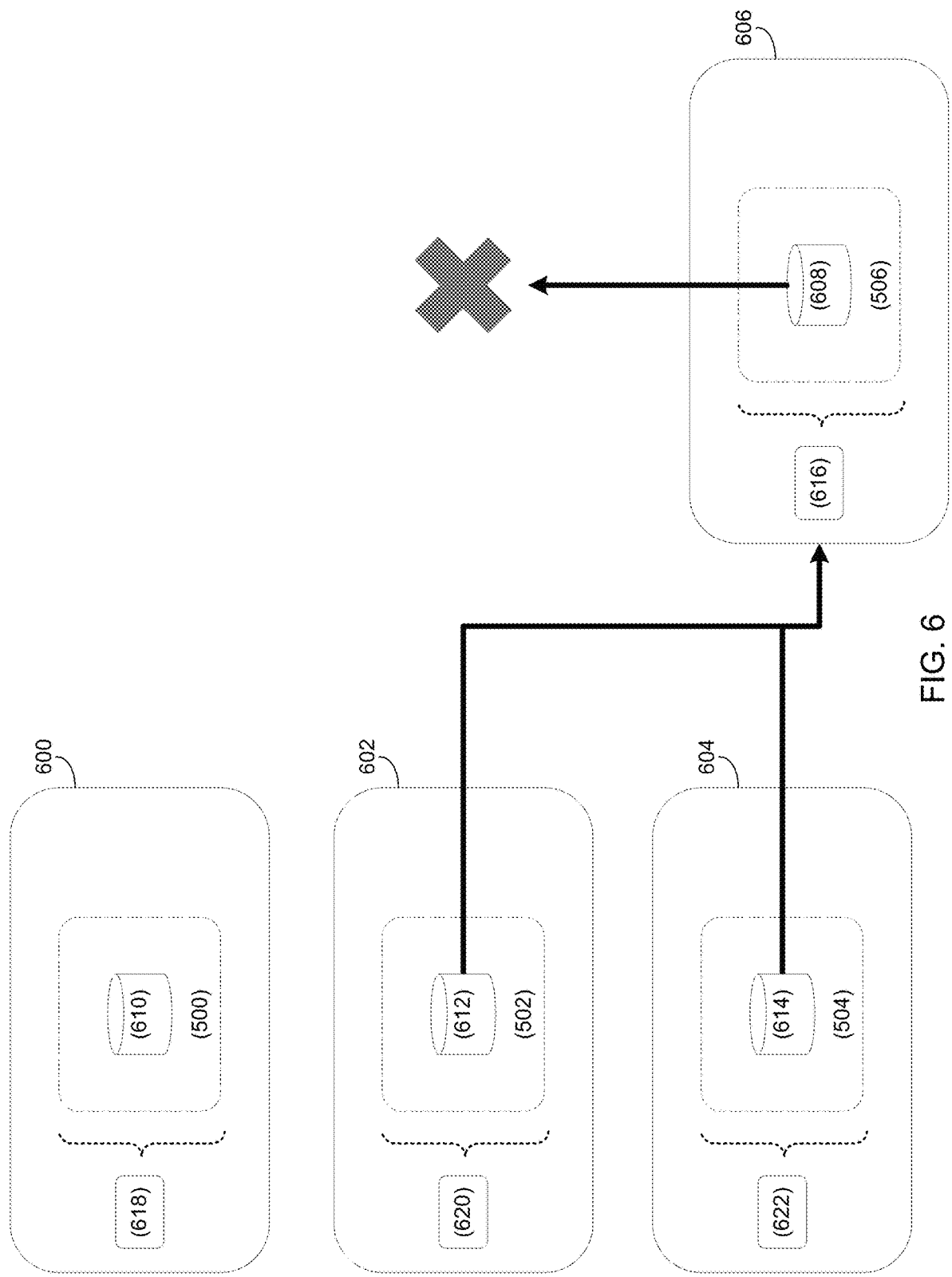

SYSTEM AND METHOD FOR MACHINE LEARNING-BASED DATA ARCHIVING IN STORAGE SYSTEMS

BACKGROUND

The ability to forecast the future activity of storage objects such as files, volumes, or extents, in a storage system, can enable significant performance gains. For example, it can enable better tiering and caching in a storage array, assist in load balancing across a storage cluster, or help guide data placement and movement in a cloud or combined on-premises and cloud environment. The level of activity is often referred to as the "temperature" of the storage object, where an active object is considered "hot" and an inactive object is considered "cold". The temperature may be defined in terms of the number of IO operations performed by the storage object in a given time unit, the total number of bytes transferred, or some combination of similar metrics.

A machine-learning (ML) based approach can forecast the future temperature of storage objects with far greater accuracy (i.e., smaller error) than simple statistical methods, and this can result in much better overall performance (e.g., higher cache hit and lower overall latency). When the goal of the temperature forecasting is tiering or caching, the accuracy of the model in its top range is most important. For example in a two-tier system with a 20%-80% ration between the top tier (e.g. SSD) and bottom tier (e.g. HDD), the forecast is used to identify the top 20% hottest storage objects (e.g. files, volumes or slices) that should be placed on the top tier, and all the remaining objects will be placed in the lower tier. However, the process for identifying candidate storage objects for long term archiving is not simply the inverse of identifying candidate storage objects for tiering the most active storage objects.

Summary of Disclosure

In one example implementation, a computer-implemented method executed on a computing device may include, but is not limited to, processing a plurality of historical input/output (IO) requests associated with a plurality of storage objects of a storage system from a plurality of time intervals. The plurality of storage objects may be divided into a plurality of storage activity classes using a classification-based machine learning model and the plurality of historical IO requests. A next access time for each storage object may be forecasted based upon, at least in part, the plurality of storage activity classes.

One or more of the following example features may be included. Dividing the plurality of storage objects into the plurality of classes may include generating a plurality of IO features using the plurality of IO requests. The plurality of IO features may include one or more of: an average amount of time between consecutive IO requests during each time interval; a total amount of IO requests during each time interval; a total amount of bandwidth during each time interval; an average IO request size during each time interval; an average amount of time between consecutive read IO requests during each time interval; a frequency of activity during each time interval; and an average amount of time between active time intervals of the plurality of time intervals. Dividing the plurality of storage objects into the plurality of classes may include processing the plurality of IO features using the classification-based machine learning model. A storage object from the plurality of storage objects may be archived based upon, at least in part, the forecasted next access time for the storage object. Archiving the storage object may be further based upon, at least in part, one or more of: a storage system capacity; a cost for archiving the storage object; a cost for retrieving the storage object from an archive; and a storage cost/storage performance tradeoff when archiving the storage object. One or more candidate storage objects may be identified for removal based upon, at least in part, the forecasted next access time for each storage object.

In another example implementation, a computer program product resides on a computer readable medium that has a plurality of instructions stored on it. When executed by a processor, the instructions cause the processor to perform operations that may include, but are not limited to, processing a plurality of historical input/output (IO) requests associated with a plurality of storage objects of a storage system from a plurality of time intervals. The plurality of storage objects may be divided into a plurality of storage activity classes using a classification-based machine learning model and the plurality of historical IO requests. A next access time for each storage object may be forecasted based upon, at least in part, the plurality of storage activity classes.

One or more of the following example features may be included. Dividing the plurality of storage objects into the plurality of classes may include generating a plurality of IO features using the plurality of IO requests. The plurality of IO features may include one or more of: an average amount of time between consecutive IO requests during each time interval; a total amount of IO requests during each time interval; a total amount of bandwidth during each time interval; an average IO request size during each time interval; an average amount of time between consecutive read IO requests during each time interval; a frequency of activity during each time interval; and an average amount of time between active time intervals of the plurality of time intervals. Dividing the plurality of storage objects into the plurality of classes may include processing the plurality of IO features using the classification-based machine learning model. A storage object from the plurality of storage objects may be archived based upon, at least in part, the forecasted next access time for the storage object. Archiving the storage object may be further based upon, at least in part, one or more of: a storage system capacity; a cost for archiving the storage object; a cost for retrieving the storage object from an archive; and a storage cost/storage performance tradeoff when archiving the storage object. One or more candidate storage objects may be identified for removal based upon, at least in part, the forecasted next access time for each storage object.

In another example implementation, a computing system includes at least one processor and at least one memory architecture coupled with the at least one processor, wherein the at least one processor is configured to process a plurality of historical input/output (IO) requests associated with a plurality of storage objects of a storage system from a plurality of time intervals. The plurality of storage objects may be divided into a plurality of storage activity classes using a classification-based machine learning model and the plurality of historical IO requests. A next access time for each storage object may be forecasted based upon, at least in part, the plurality of storage activity classes.

One or more of the following example features may be included. Dividing the plurality of storage objects into the plurality of classes may include generating a plurality of IO features using the plurality of IO requests. The plurality of IO features may include one or more of: an average amount of time between consecutive IO requests during each time interval; a total amount of IO requests during each time interval; a total amount of bandwidth during each time interval; an average IO request size during each time interval; an average amount of time between consecutive read IO requests during each time interval; a frequency of activity during each time interval; and an average amount of time between active time intervals of the plurality of time intervals. Dividing the plurality of storage objects into the plurality of classes may include processing the plurality of IO features using the classification-based machine learning model. A storage object from the plurality of storage objects may be archived based upon, at least in part, the forecasted next access time for the storage object. Archiving the storage object may be further based upon, at least in part, one or more of: a storage system capacity; a cost for archiving the storage object; a cost for retrieving the storage object from an archive; and a storage cost/storage performance tradeoff when archiving the storage object. One or more candidate storage objects may be identified for removal based upon, at least in part, the forecasted next access time for each storage object.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 6 is an example diagrammatic view of the archiving of storage objects according to one or more example implementations of the disclosure.

Like reference symbols in the various drawings indicate like elements.

DETAILED DESCRIPTION

Figure 1:
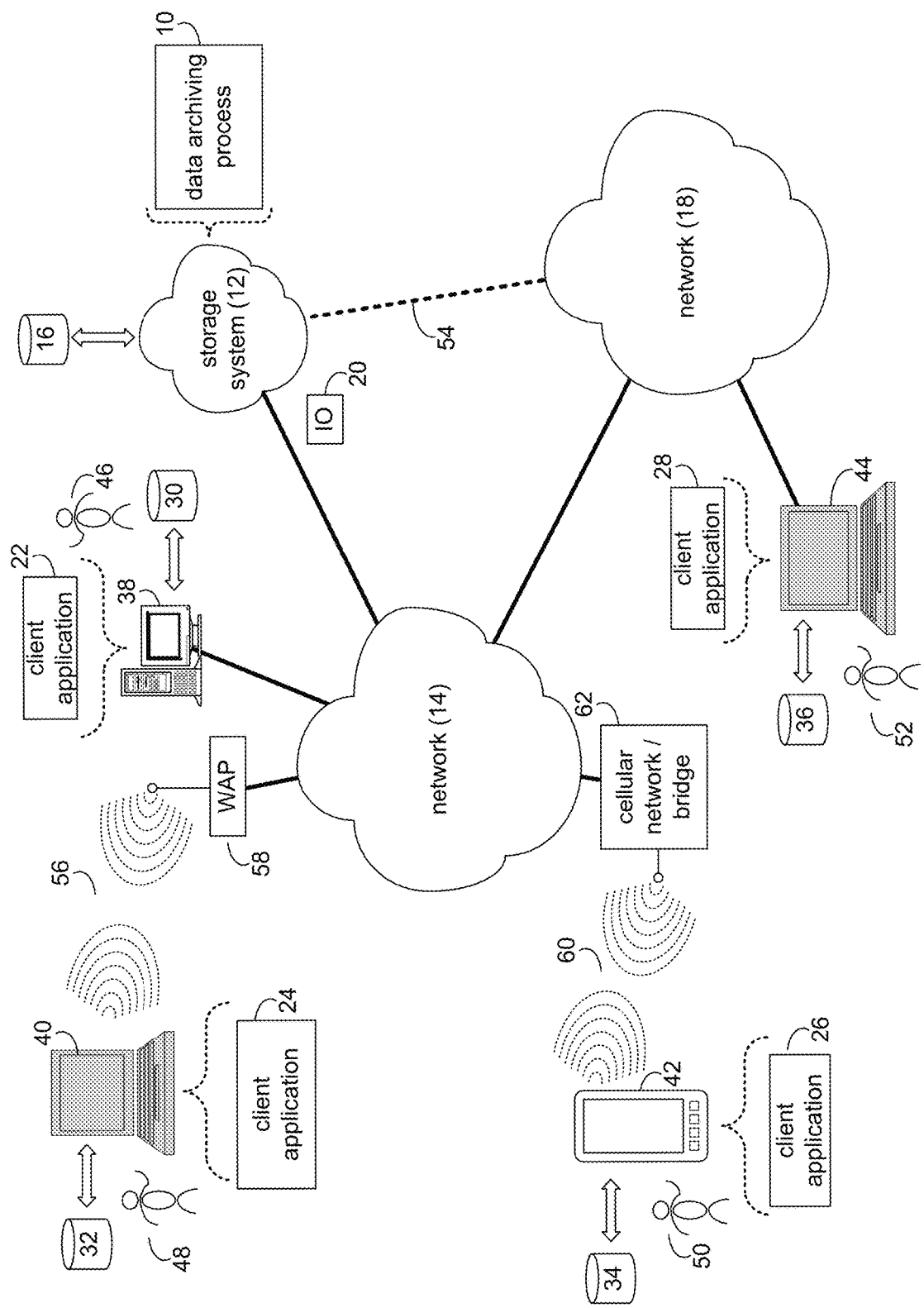
FIG. 1 is an example diagrammatic view of a storage system and a data archiving process coupled to a distributed computing network according to one or more example implementations of the disclosure.

System Overview:

Referring to FIG. 1, there is shown data archiving process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data archiving process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data archiving process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data archiving process, such as data archiving process 10 of FIG. 1, may include but is not limited to, processing a plurality of historical input/output (IO) requests associated with a plurality of storage objects of a storage system from a plurality of time intervals. The plurality of storage objects may be divided into a plurality of storage activity classes using a classification-based machine learning model and the plurality of historical IO requests. A next access time for each storage object may be forecasted based upon, at least in part, the plurality of storage activity classes.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
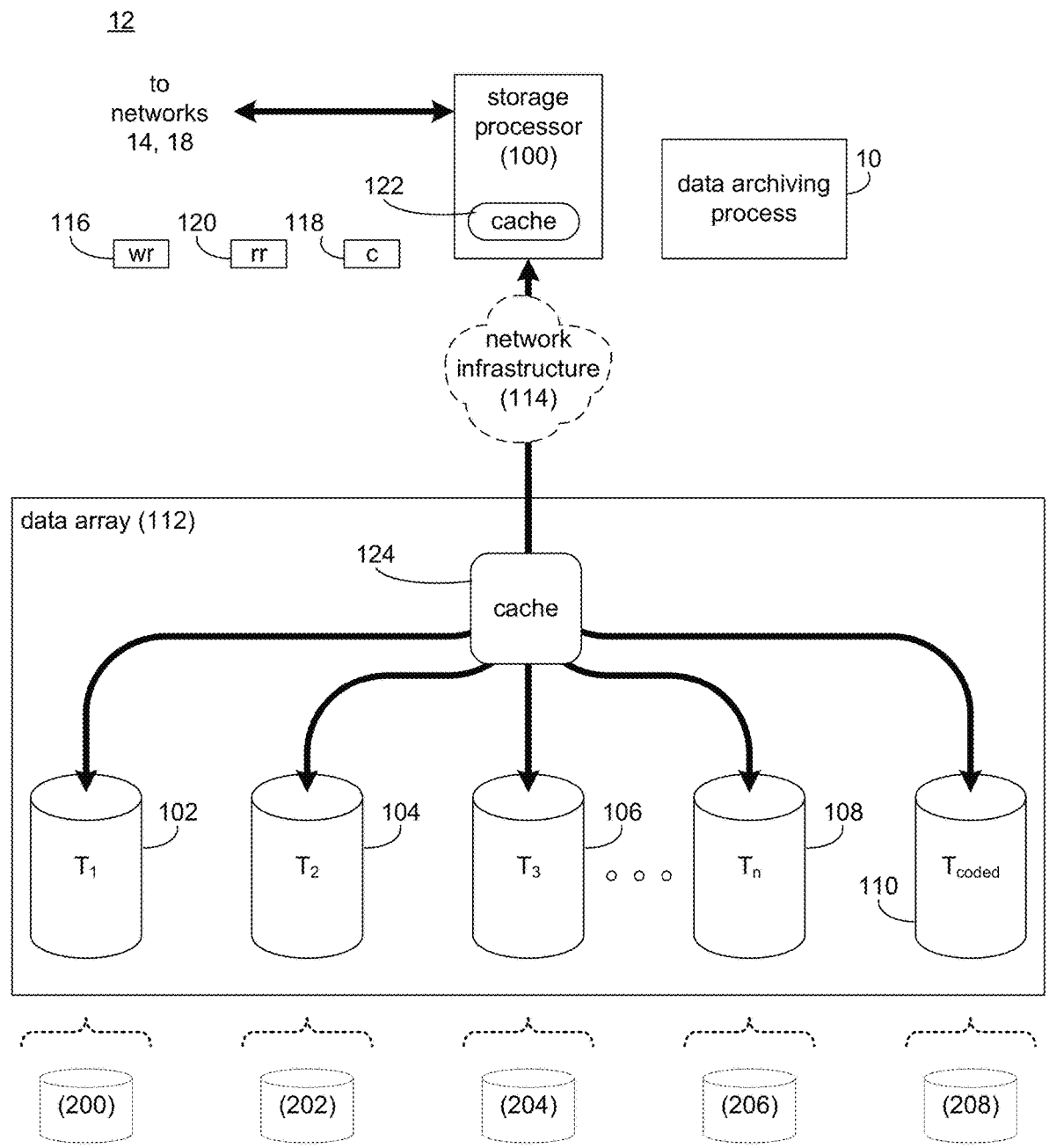
FIG. 2 is an example diagrammatic view of the storage system of FIG. 1 according to one or more example implementations of the disclosure.
Figure 3:
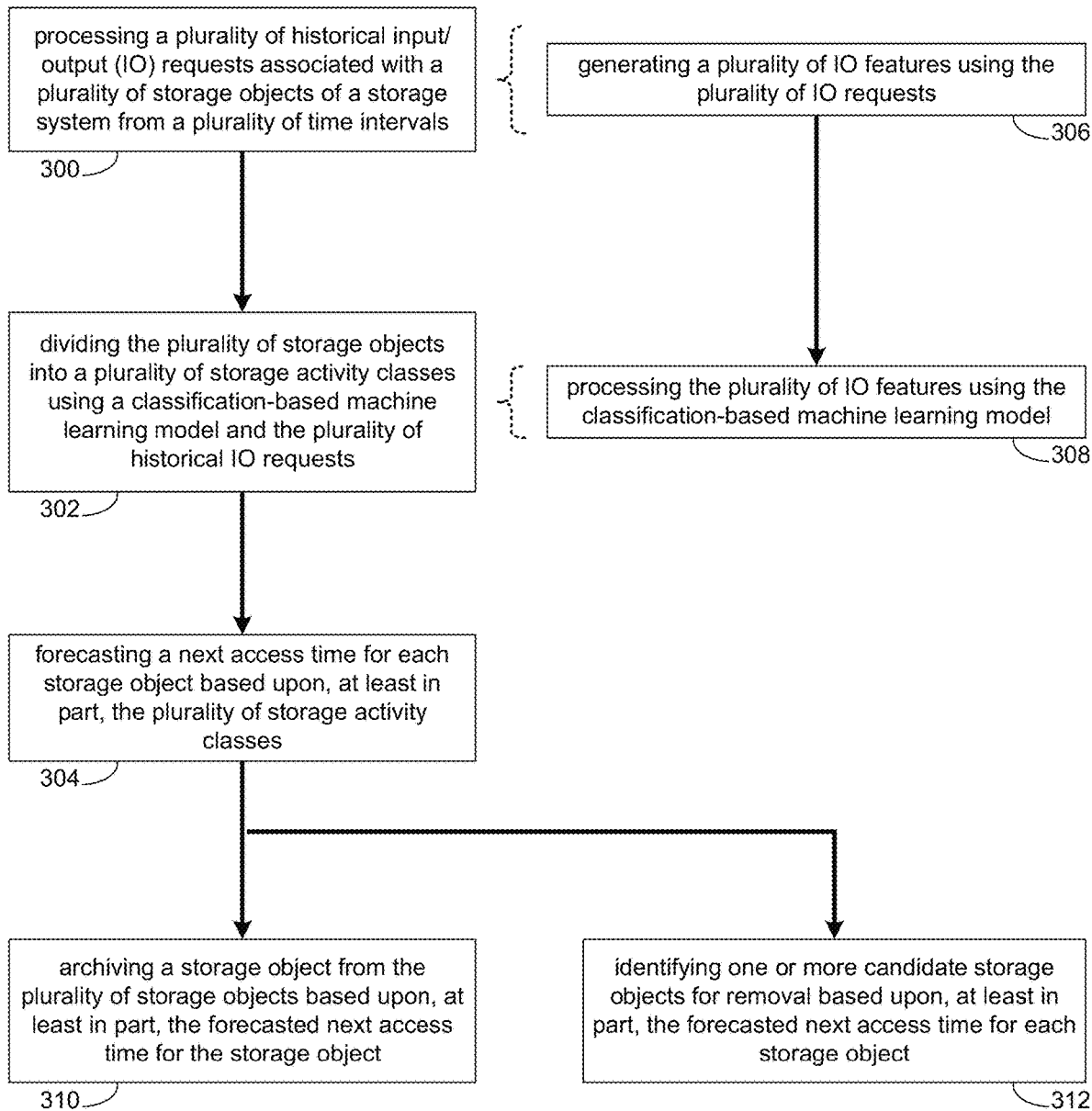
FIG. 3 is an example flowchart of data archiving process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data archiving process 10. The instruction sets and subroutines of data archiving process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data archiving process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of data archiving process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data archiving process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Data Archiving Process:

Referring also to the examples of FIGS. 3-6 and in some implementations, data archiving process 10 may process 300 a plurality of historical input/output (IO) requests associated with a plurality of storage objects of a storage system from a plurality of time intervals. The plurality of storage objects may be divided 302 into a plurality of storage activity classes using a classification-based machine learning model and the plurality of historical IO requests. A next access time for each storage object may be forecasted 304 based upon, at least in part, the plurality of storage activity classes.

As will be discussed in greater detail below, implementations of the present disclosure may allow for the forecasting and archiving of storage objects using a classification machine learning model trained to predict for each storage object the next time this object will be accessed. As will be discussed in greater detail below, data archiving process 10 identifies "cold" storage objects that are candidates for long term archival and identifies potentially obsolete storage objects that may be removed/deleted. As will be discussed in greater detail below, data archiving process 10 balances machine learning model accuracy (precision and recall) and cost savings achieved by archiving storage objects.

In some implementations, data archiving process 10 processes 300 a plurality of input/output (IO) requests associated with a plurality of storage objects of a storage system. For example and referring again to FIG. 2, during the operation of a storage system (e.g., storage system 12), IO operations may be generated for processing data on various storage objects (e.g., storage objects 200, 202, 204, 206, 208). Storage objects (e.g., storage objects 200, 202, 204, 206, 208) may generally include any container or storage unit configured to store data within a storage system (e.g., storage system 12). For example, a storage object may be any one of the following: a volume (aka Logical Unit Number (LUN)), a file, or parts thereof that may be defined e.g. by offsets or address ranges (e.g., sub-LUNs, disk extents, and/or slices). In some implementations, the plurality of storage objects include a block storage object and/or a file storage object. A block storage object is a block or chunk of storage that can be accessed by various operating systems. In some implementations, a file storage object is a folder or subset of a hierarchical data structure accessible by a particular path within the hierarchical data structure.

Figure 4:
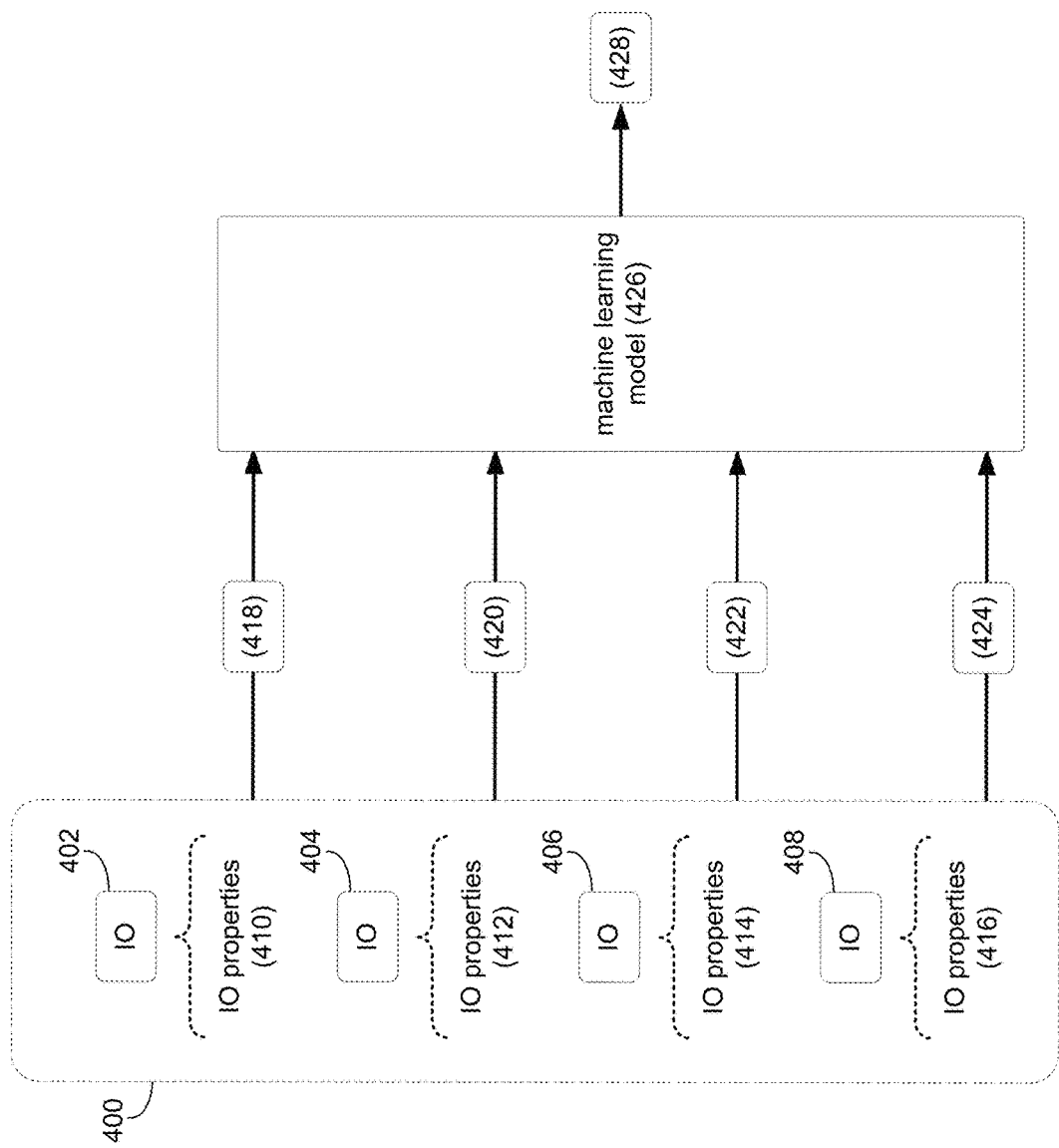
FIG. 4 is an example diagrammatic view of the training of a machine learning model according to one or more example implementations of the disclosure.

Referring also to FIG. 4, a plurality of IO requests (e.g., plurality of IO requests 400) may include e.g., four IO requests associated with various storage objects and/or the same storage object. IO request 402 may include a request to perform a read IO operation on a first storage object (e.g., storage object 200); IO request 404 may include a request to perform a write IO operation on storage object 200; IO request 406 may include a request to perform a read IO operation on storage object 200; and IO request 408 may include a request to perform an operation on storage object 200. While four separate IO requests for a single storage object have been described, it will be appreciated that this is for example purposes only and that any number of IO requests may be received for any number of storage objects within the present disclosure.

In some implementations, data archiving process 10 generates 306 a plurality of IO features using the plurality of IO requests. An IO feature is a representation of a plurality of IO properties associated with a particular storage object over a period of time. In some implementations, an IO feature is used by a machine learning model to identify trends indicative of a ransomware attack involving the storage object. Examples of IO features include a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; etc.

In some implementations, data archiving process 10 generates 306 a plurality of IO features using the plurality of IO requests that are especially meaningful for archiving storage objects. For example, data archiving process 10 may generate 306 an IO feature for an average amount of time between consecutive IO requests during each time interval; and IO feature for a total amount of IO requests during each time interval; an IO feature for a total amount of bandwidth during each time interval; an IO feature for an average IO request size during each time interval; an IO feature for an average amount of time between consecutive read IO requests during each time interval; an IO feature for a frequency of activity during each time interval; and/or an IO feature for an average amount of time between active time intervals of the plurality of time intervals.

In some implementations, data archiving process 10 generates 306 the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of IO requests. In this manner, data archiving process 10 may extract various IO properties associated with the plurality of IO requests. Referring again to FIG. 4 and in some implementations, data archiving process 10 may extract one or more IO properties from plurality of IO requests 400. For example, data archiving process 10 may extract IO properties 418 from IO request 402; IO properties 420 from IO request 404; IO properties 422 from IO request 406; and IO properties 424 from IO request 408.

In some implementations, generating 306 the plurality of IO features using the plurality of IO requests includes aggregating the plurality of IO requests periodically, and generating the plurality of IO features using the aggregated plurality of IO requests. For example, data archiving process 10 may aggregate the one or more IO properties periodically to optimize for memory/storage requirements and/or CPU costs. Additionally, data archiving process 10 may use a sampling approach where IO properties for every "n"th IO request are extracted. In some implementations, the number of IO requests between extracting the one or more IO properties may be user-defined, a default number of IO requests, and/or defined automatically by data archiving process 10. In this manner, data archiving process 10 may limit the amount of processing of IO requests to generate IO features by sampling and aggregating a limited set of all of the IO requests received at the storage system. Referring again to FIG. 4 and in some implementations, data archiving process 10 may aggregate IO properties 410 from IO request 402; IO properties 412 from IO request 404; IO properties 414 from IO request 406; and IO properties 416 from IO request 408 and generate a plurality of IO features (e.g., IO features 418, 420, 422, 424).

In some implementations, data archiving process 10 may divide 302 the plurality of storage objects into a plurality of storage activity classes using a classification-based machine learning model and the plurality of historical IO requests. A machine learning model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure.

In some implementations, data archiving process 10 divides the plurality of storage objects into a plurality of classes using a classification-based machine learning model. A classification-based machine learning model (e.g., machine learning model 426) is a machine learning model configured to classify storage objects into classes based on the plurality of IO requests processed for that storage object. In some implementations, the classification-based machine learning model assigns or divides a storage object into a particular class using a logarithmic-based or logarithmic scale-based representation of a continuous variable (e.g., the number of IO requests, total amount of data transferred by IO requests, etc.) in a given time interval. For example, as opposed to determining a temperature for each storage object as a particular value using a continuous regression variable, data archiving process 10 determines a log-based value of the continuous variables discussed above and generates a plurality of classes to represent the various log-based values. Referring again to FIG. 4 and in some implementations, data archiving process 10 may process 308 the plurality of IO features (e.g., IO features 418, 420, 422, 424) using a classification-based machine learning model (e.g., machine learning model 426).

In some implementations, dividing 302 the plurality of storage objects into the plurality of classes includes processing 308 the plurality of IO features using the classification-based machine learning model. For example, data archiving process 10 processes the plurality of IO features (e.g., a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests, etc.) to generate logarithmic-based values. Data archiving process 10 uses these logarithmic-based values to generate a plurality of classes. For example, suppose data archiving process 10 generates an IO feature that includes a read bandwidth value over a particular interval of time. From this IO feature, data archiving process 10 may generate log-based read bandwidth values and group these values to form a plurality of classes.

In some implementations, each class may represent the likelihood or probability that a particular storage object may be accessed (i.e., read from and/or written to) within a given time interval. For example, when processing the plurality of IO features, data archiving process 10 may classify the likelihood or probability that a particular storage object will be accessed as a plurality of classes indicative of respective probability ranges. For instance, a storage object that is determined to be unlikely to be accessed within a particular time interval (e.g., based on thresholds or weights) may be classified into a first class while a storage object that is determined to be very likely to be accessed within a particular time interval (e.g., based on thresholds or weights) may be classified into a second class. As will be discussed in greater detail below, data archiving process 10 may associate each class with an expected next time a particular storage object will be accessed.

Figure 5:
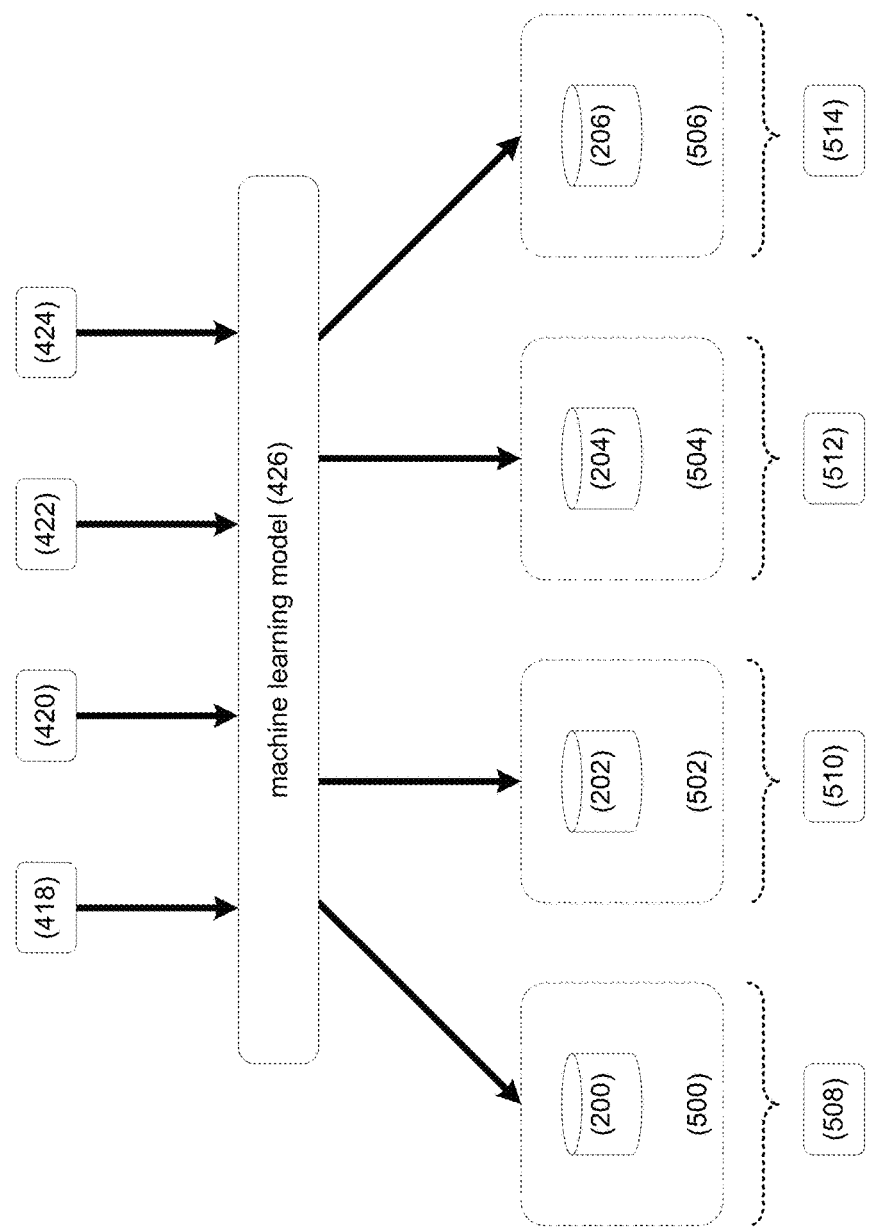
FIG. 5 is an example diagrammatic view of the dividing of storage objects into classes according to one or more example implementations of the disclosure.

Referring also to FIG. 5, suppose that data archiving process 10 processes a plurality of IO features (e.g., IO features 418, 420, 422, 424) for a plurality of storage objects (e.g., storage objects 200, 202, 204, 206) using a classification-based machine learning model (e.g., machine learning model 426). In this example, data archiving process 10 may use IO features 418, 420, 422, 424 to generate log-based values. Data archiving process 10 may group these log-based values into a plurality of classes (e.g., classes 500, 502, 504, 506). With the plurality of classes (e.g., classes 500, 502, 504, 506), data archiving process 10 may divide 302 the plurality of storage objects (e.g., storage objects 200, 202, 204, 206) among the plurality of classes. For example, suppose that data archiving process 10 divides storage object 200 into class 500; storage object 202 into class 502; storage object 204 into class 504; and storage object into class 506. While this example includes four classes, it will be appreciated that data archiving process 10 may divide 302 the plurality of storage objects into any number of classes within the scope of the present disclosure. In some implementations, the number of and/or distribution characteristics of each class may be user-defined, a default value or set of values, and/or determined by data archiving process 10.

In some implementations, data archiving process 10 may forecast 304 a next access time for each storage object based upon, at least in part, the plurality of storage activity classes. Forecasting 304 a next access time for each storage object may include generating a time range in which a storage object is most likely to be accessed next. For example, processing the plurality of IO features to determine a definitive access time would require significant processing by the machine learning model for each storage object. However, by defining a less exact "class" or time range in which the storage object is to be access next, fewer IO features and/or processing resources will be required of the machine learning model for each storage object. As will be discussed in greater detail below, the next access time may be utilized by various archiving policies to optimize the archiving of the storage objects within the storage system. For example, the next access time prediction may enable various archiving policies that use the forecasted next access time, along with other values such as the system parameters (e.g., the tiering hierarchy topology, sizes of various layers, etc.), to optimize archiving decisions, resulting in a performance gain and/or cost savings.

In some implementations, forecasting 304 the next access time for a storage object may include associating a next access time with each storage object based upon, at least in part, the plurality of classes. For example and as discussed above, suppose that data archiving process 10 divides 302 the plurality of storage objects into a plurality of classes based upon, at least in part, the plurality of IO features. In this example, each class may represent a grouping of log-based values for the plurality of IO features indicative of the likelihood that a storage object will be accessed (e.g., read from and/or written to) within a particular time interval. Referring again to FIG. 5 and the above example, suppose data archiving process 10 divides 302 storage objects 200, 202, 204, 206 into classes 500, 502, 504, 506. As discussed above, each of classes 500, 502, 504, 506 may represent a likelihood or probability that a storage object within that class will be accessed (e.g., read from and/or written to) within a particular time interval. Accordingly, data archiving process 10 may associate a next access time with each class (e.g., next access time 508 for class 500; next access time 510 for class 502; next access time 512 for class 504; and next access time 514 for class 506.

For example, suppose class 500 represents a first grouping of storage objects including the least accessed (e.g., in terms of read access, write access, or both) storage objects (i.e., the next access time is in more than six months); class 502 represents a second grouping of storage objects that are accessed more frequently than those of class 500 but less than those of class 504 (i.e., the next access time is between four and six months); class 504 represents a third grouping of storage objects that are accessed more frequently than those of class 502 but less than those of class 506 (i.e., the next access time is between two and four months); and class 506 represents a fourth grouping of storage objects that are accessed more frequently than those of class 504 (e.g., the next access time is in two months or sooner). In this example, data archiving process 10 may associate each class with a next access time.

In some implementations, data archiving process 10 may archive 310 a storage object from the plurality of storage objects based upon, at least in part, the forecasted next access time for the storage object. Archiving 310 a storage object generally includes storing the storage object in archive storage. Archive storage is a long term storage tier with reduced performance capabilities. Accordingly, the time cost for accessing storage objects in archive storage is significant compared to other storage tiers. However, the costs for obtaining or using storage capacity within archive storage is significantly lower than other storage tiers. As such, archive storage allows for cost savings by using lower performance storage devices by reducing access time as retrieving storage objects from archive storage is costly in terms of latency. Referring also to FIG. 6 and in some implementations, suppose storage system 12 includes or has access to e.g., four different storage tiers (e.g., storage tiers 600, 602, 604, 606) with four different performance levels. For example, storage tier 600 may be associated with a high level performance storage tier (e.g., NVRAM); storage tier 602 may be associated with a mid-level performance storage tier (e.g., SSD); storage tier 604 may be associated with a low level performance storage tier (e.g., HDD); and storage tier 606 may be associated with an off premise, low level performance storage tier (e.g., archive storage).

For example, storage tier 606 may include cloud storage tiering. Data archiving process 10 may provide data movement between on premise storage tiers (e.g., storage tiers 600, 602, 604) and private or public cloud storage (e.g., storage tier 606), and data movement between multiple cloud storage service types, by treating the cloud storage services as additional storage tiers with known retrieval times, transfer and storage costs, much like local media such as tape archives. Accordingly, data archiving process 10 may provide for tiering between any number of or type of storage tiers within the scope of the present disclosure.

In some implementations, archiving 310 the storage object is further based upon, at least in part, one or more of: a storage system capacity; a cost for archiving the storage object; a cost for retrieving the storage object from an archive; and a storage cost/storage performance tradeoff when archiving the storage object. For example, suppose that storage object 608 is divided 302 into class 506; storage object 610 is divided 302 into class 500; storage object 612 is divided 302 into class 502; and storage object 614 is divided 302 into class 504. Further suppose that data archiving process 10 forecasts 304 a next access time for each storage object as follows: next access time 616 for storage object 608; next access time 618 for storage object 610; next access time 620 for storage object 612; and next access time 622 for storage object 614. In this example, next access time 616 indicates that storage object 608 is forecast 304 not to be accessed within the next six months; next access time 618 indicates that storage object 610 is forecast 304 to be accessed within two months; next access time 620 indicates that storage object 612 is forecast 304 to be accessed within two to four months; and that next access time 622 indicates that storage object 614 is forecast 304 to be accessed within four to six months.

In this example, data archiving process 10 does not archive storage object 610 to storage tier 606 (e.g., archive storage) as storage object 610 has next access time 618 indicative that storage object 610 will be accessed within two months. Further, data archiving process 10 determines the cost for archiving storage object 610 and the cost for retrieving storage object 610 from storage tier 606. Additionally, data archiving process 10 determines a storage cost/storage performance tradeoff associated with archiving storage object 610 to storage tier 606. Accordingly, data archiving process 10 determines that based various archiving thresholds concerning storage system capacity, archiving cost, retrieval cost, and storage cost/storage performance tradeoff, that storage object 610 is not archived 310 to storage tier 606.

Continuing with the above example, suppose that data archiving process 10 determines the storage system capacity, archiving cost, retrieval cost, and storage cost/storage performance tradeoff for archiving storage object 612 from storage tier 602 to storage tier 606 based upon next access time 620. In this example, data archiving process 10 archives 310 storage object 612 to storage tier 606. Additionally, suppose that data archiving process 10 determines the storage system capacity, archiving cost, retrieval cost, and storage cost/storage performance tradeoff for archiving storage object 614 from storage tier 604 to storage tier 606 based upon next access time 622. In this example, data archiving process 10 archives 310 storage object 614 to storage tier 606.

An archiving policy may generally include a rule or portion of logic that determines the conditions for archiving a storage object within a storage system. Archiving policies may be user-defined and/or automatically define by data archiving process 10. As discussed above, archiving policies may utilize the next access time defined by the one or more machine learning models along with other system parameters (e.g., storage system capacity; the cost for archiving the storage object; the cost for retrieving the storage object from an archive; and the storage cost/storage performance tradeoff when archiving the storage object, etc.), to optimize archiving decisions.

In some implementations, data archiving process 10 may define a plurality of archiving thresholds based upon, at least in part, the next access time for each storage object. For example, data archiving process 10 may define archiving thresholds based on storage system capacity, the cost for archiving the storage object; the cost for retrieving the storage object from an archive; and the storage cost/storage performance tradeoff when archiving the storage object, etc. Each archiving threshold may be defined with an initial threshold, a default threshold, a user-defined threshold (e.g., input via a user interface), and/or may be an automatically defined threshold (e.g., generated by data archiving process 10).

In some implementations, data archiving process 10 may classify storage objects in the form of slices or volumes. In one example implementations, data archiving process 10 trains a machine learning model to archive volumes. Suppose that one target archiving policy is to archive storage objects that will not be accessed in the next four months. Accordingly, data archiving process 10 archives 310 3.5% of the volumes with a precision (i.e., the probability or confidence that the next access time for the archival class is correct where the archived volumes will not be accessed ahead of time) of 96% and a recall (i.e., the percentage of volumes that could have been archived that were correctly identified) of 88% for the archival class. Now suppose that another target archiving policy is to archive storage objects that will not be accessed in the next two months. Accordingly, data archiving process 10 archives 310 6.5% of the volumes with a precision of 95% and a recall of 78% for the archival class.

In another example implementations, data archiving process 10 trains a machine learning model with the assumption that the storage objects, i.e. the archival candidates, are thirty-two megabyte slices. Suppose that one target archiving policy is to archive storage objects that will not be accessed in the next four months. Accordingly, data archiving process 10 archives 310 38% of the slices with a precision of 98% and a recall of 96% for the archival class. Now suppose that another target archiving policy is to archive storage objects that will not be accessed in the next two months. Accordingly, data archiving process 10 archives 46% of the slices with a precision of 99% and a recall of 93% for the archival class. In these examples, the classification of storage objects (e.g., volumes or slices) using data archiving process 10 shows high precision and recall.

In some implementations, data archiving process 10 may identify 312 one or more candidate storage objects for removal based upon, at least in part, the forecasted next access time for each storage object. For example, suppose data archiving process 10 divides 302 storage object 608 into class 506 with next access time 616 indicative of a next access time no sooner than six months. In some implementations, data archiving process 10 identifies 312 one or more candidate storage objects for removal based upon, the forecasted next access time (e.g., next access time 616). For instance, data archiving process 10 may define a storage object removal threshold defining conditions for removing storage objects. In one example, the removal threshold may include a threshold next access time, a storage capacity, the cost for archiving the storage object; the cost for retrieving the storage object from an archive; and the storage cost/ storage performance tradeoff when archiving the storage object, etc. Continuing with the above example, using a removal threshold, data archiving process 10 identifies 312 candidate storage object 608 for removal based upon, at least in part, its forecasted next access time (as shown by the "X" in FIG. 6). Data archiving process 10 may provide a user with a listing of candidate storage objects for removal and/or may automatically remove candidate storage objects when the storage object meets particular conditions. In some implementations, the removal threshold may be user-defined.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    processing a plurality of historical input/output (IO) requests associated with a plurality of storage objects of a storage system from a plurality of time intervals;
    dividing the plurality of storage objects into a plurality of storage activity classes using a classification-based machine learning model and the plurality of historical IO requests; and
    forecasting a next access time range for each storage object based upon, at least in part, the plurality of storage activity classes.

2. The computer-implemented method of claim 1, wherein dividing the plurality of storage objects into the plurality of classes includes generating a plurality of IO features using the plurality of IO requests.

3. The computer-implemented method of claim 2, wherein the plurality of IO features include one or more of:
    an average amount of time between consecutive IO requests during each time interval;
    a total amount of IO requests during each time interval;
    a total amount of bandwidth during each time interval;
    an average IO request size during each time interval;
    an average amount of time between consecutive read IO requests during each time interval;
    a frequency of activity during each time interval; and
    an average amount of time between active time intervals of the plurality of time intervals.

4. The computer-implemented method of claim 2, wherein dividing the plurality of storage objects into the plurality of classes includes processing the plurality of IO features using the classification-based machine learning model.

5. The computer-implemented method of claim 1, further comprising:
    archiving a storage object from the plurality of storage objects based upon, at least in part, the forecasted next access time range for the storage object.

6. The computer-implemented method of claim 5, wherein archiving the storage object is further based upon, at least in part, one or more of:
    a storage system capacity;
    a cost for archiving the storage object;
    a cost for retrieving the storage object from an archive; and
    a storage cost/storage performance tradeoff when archiving the storage object.

7. The computer-implemented method of claim 1, further comprising:
    identifying one or more candidate storage objects for removal based upon, at least in part, the forecasted next access time range for each storage object.

8. A computer program product residing on a non-transitory computer readable medium having a plurality of instructions stored thereon which, when executed by a processor, cause the processor to perform operations comprising:
    processing a plurality of historical input/output (IO) requests associated with a plurality of storage objects of a storage system from a plurality of time intervals;
    dividing the plurality of storage objects into a plurality of storage activity classes using a classification-based machine learning model and the plurality of historical IO requests; and
    forecasting a next access time range for each storage object based upon, at least in part, the plurality of storage activity classes.

9. The computer program product of claim 8, wherein dividing the plurality of storage objects into the plurality of classes includes generating a plurality of IO features using the plurality of IO requests.

10. The computer program product of claim 9, wherein the plurality of IO features include one or more of:
    an average amount of time between consecutive IO requests during each time interval;
    a total amount of IO requests during each time interval;
    a total amount of bandwidth during each time interval;
    an average IO request size during each time interval;
    an average amount of time between consecutive read IO requests during each time interval;
    a frequency of activity during each time interval; and
    an average amount of time between active time intervals of the plurality of time intervals.

11. The computer program product of claim 9, wherein dividing the plurality of storage objects into the plurality of classes includes processing the plurality of IO features using the classification-based machine learning model.

12. The computer program product of claim 8, further comprising:
    archiving a storage object from the plurality of storage objects based upon, at least in part, the forecasted next access time range for the storage object.

13. The computer program product of claim 12, wherein archiving the storage object is further based upon, at least in part, one or more of:
    a storage system capacity;
    a cost for archiving the storage object;
    a cost for retrieving the storage object from an archive; and
    a storage cost/storage performance tradeoff when archiving the storage object.

14. The computer program product of claim 8, further comprising:

identifying one or more candidate storage objects for removal based upon, at least in part, the forecasted next access time range for each storage object.

15. A computing system comprising:
a memory; and
a processor configured to process a plurality of historical input/output (IO) requests associated with a plurality of storage objects of a storage system from a plurality of time intervals, to divide the plurality of storage objects into a plurality of storage activity classes using a classification-based machine learning model and the plurality of historical IO requests, and to forecast a next access time range for each storage object based upon, at least in part, the plurality of storage activity classes.

16. The computing system of claim 15, wherein dividing the plurality of storage objects into the plurality of classes includes generating a plurality of IO features using the plurality of IO requests.

17. The computing system of claim 16, wherein the plurality of IO features include one or more of:
an average amount of time between consecutive IO requests during each time interval;
a total amount of IO requests during each time interval;
a total amount of bandwidth during each time interval;
an average IO request size during each time interval;
an average amount of time between consecutive read IO requests during each time interval;
a frequency of activity during each time interval; and
an average amount of time between active time intervals of the plurality of time intervals.

18. The computing system of claim 16, wherein dividing the plurality of storage objects into the plurality of classes includes processing the plurality of IO features using the classification-based machine learning model.

19. The computing system of claim 15, wherein the processor is further configured to:
archiving a storage object from the plurality of storage objects based upon, at least in part, the forecasted next access time range for the storage object.

20. The computing system of claim 19, wherein archiving the storage object is further based upon, at least in part, one or more of:
storage system capacity;
a cost for archiving the storage object;
a cost for retrieving the storage object from an archive; and
a storage cost/storage performance tradeoff when archiving the storage object.

* * * * *